United States Patent
Chen

(10) Patent No.: US 11,921,690 B2
(45) Date of Patent: *Mar. 5, 2024

(54) CUSTOM OBJECT PATHS FOR OBJECT STORAGE MANAGEMENT

(71) Applicant: RED HAT, INC., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 748 days.

This patent is subject to a terminal disclaimer.

(21) Appl. No.: 16/443,742

(22) Filed: Jun. 17, 2019

(65) Prior Publication Data
US 2019/0303359 A1 Oct. 3, 2019

Related U.S. Application Data

(63) Continuation of application No. 14/875,047, filed on Oct. 5, 2015, now Pat. No. 10,324,919.

(51) Int. Cl.
G06F 16/22 (2019.01)
G06F 16/23 (2019.01)
G06F 16/28 (2019.01)

(52) U.S. Cl.
CPC .......... *G06F 16/2291* (2019.01); *G06F 16/22* (2019.01); *G06F 16/2365* (2019.01); *G06F 16/285* (2019.01)

(58) Field of Classification Search
CPC .... G06F 16/2291; G06F 16/22; G06F 16/285; G06F 16/2365
USPC ....................................................... 707/692
See application file for complete search history.

(56) References Cited

U.S. PATENT DOCUMENTS

| 7,539,771 | B2 | 5/2009 | de Castro et al. |
| 7,925,624 | B2 * | 4/2011 | Vosshall .............. G06F 16/2365 707/610 |
| 8,484,259 | B1 | 7/2013 | Makkar et al. |
| 8,756,249 | B1 | 6/2014 | Wallace et al. |
| 8,918,372 | B1 | 12/2014 | Guo et al. |
| 2008/0256143 | A1 | 10/2008 | Reddy et al. |
| 2009/0169168 | A1 | 7/2009 | Ishikawa |

(Continued)

FOREIGN PATENT DOCUMENTS

| WO | 2006098016 | 9/2006 |
| WO | 2014133497 | 9/2014 |

OTHER PUBLICATIONS

DeCandia, Giuseppe, et al., "Dynamo: Amazon's Highly Available Key-value Store", Dec. 2007, ACM SIGOPS Oper Syst Rev, vol. 41, Issue 6, pp. 205-220. (Year: 2007).*

(Continued)

*Primary Examiner* — Scott A. Waldron
(74) *Attorney, Agent, or Firm* — Womble Bond Dickinson (US) LLP

(57) ABSTRACT

A processing device receives a request to perform an operation for an object in a storage system. The request includes a custom path for the object that represents the content of the object. The custom path for the object includes a hash value resulting from a hashing algorithm. The processing device determines a data store that stores the one or more other objects having a respective custom path that corresponds to the custom path in the request. Responsive to determining the data store, the processing device performs the operation for the object using the data store.

18 Claims, 8 Drawing Sheets

(56) References Cited

U.S. PATENT DOCUMENTS

| | | |
|---|---|---|
| 2009/0204636 A1 | 8/2009 | Li et al. |
| 2010/0070515 A1* | 3/2010 | Dutton .................... G06F 16/13 |
| | | 707/E17.058 |
| 2010/0174761 A1 | 7/2010 | Longobardi et al. |
| 2010/0269124 A1 | 10/2010 | Zwisler et al. |
| 2011/0119327 A1* | 5/2011 | Masuda ............... H04L 67/1002 |
| | | 709/203 |
| 2012/0233418 A1* | 9/2012 | Barton .................. G06F 3/0644 |
| | | 711/162 |
| 2013/0054542 A1 | 2/2013 | Ollenberger et al. |
| 2013/0275618 A1 | 10/2013 | Puttaswamy Naga et al. |
| 2013/0346376 A1 | 12/2013 | Dmitriev et al. |
| 2014/0025917 A1 | 1/2014 | Kaczmarczyk et al. |
| 2014/0059094 A1 | 2/2014 | Shankar et al. |
| 2014/0105033 A1 | 4/2014 | Vasseur et al. |
| 2014/0181122 A1 | 6/2014 | Jain et al. |
| 2014/0201170 A1 | 7/2014 | Vijayan et al. |
| 2015/0012497 A1 | 1/2015 | Clark et al. |
| 2015/0039636 A1 | 2/2015 | Sederberg et al. |
| 2015/0302886 A1 | 10/2015 | Brock et al. |
| 2015/0358373 A1 | 12/2015 | Famaey et al. |
| 2016/0132523 A1 | 5/2016 | Traeger |
| 2016/0292429 A1* | 10/2016 | Manville ............. G06F 16/1748 |

OTHER PUBLICATIONS

Hashing and Data Fingerprinting in Digital Forensics; http://roussev.net/pubs/2009-IEEE-SP-hashing.pdf, Mar.-Apr. 2009; Co-published by The IEEE Computer and Reliability Societies; 7 pgs.
JD Edwards Enterprise One Tools Configurable Network Computing Implementation Guide; http://docs.oracle.com/cd/E17984_01/doc.898/e14695/undrstnd_pathcodes.htm; Oracle Help Center, Release 8.98/Update 4; 5 pgs.; retrieved Oct. 7, 2015.
OpenStack Swift Overview; hllps://swiftstack.com/openstack-swift/; SwiftStack; 19 pgs.; retrieved Oct. 7, 2015.
Rabin fingerprint; https://en.wikipedia.org/wiki/Rabin_fingerprint; Wikipedia; 2 pgs.; retrieved Oct. 7, 2015.
Bhagwat. Deepavali; Extreme Binning: Scalable. Parallel Deduplication for Chunk-based File Backup; http://cs.5ucsb.edu/-vj/projects/SDDS/ExtremeBinning.pdf; Proceedings of the 17th IEEE/ACM International Symposium on Modelling. Analysis and Simulation of Computer and Telecommunication Systems; Sep. 2009; 9 pgs.

* cited by examiner

CUSTOM OBJECT PATHS FOR OBJECT STORAGE MANAGEMENT

RELATED APPLICATIONS

This is a continuation of U.S. patent application Ser. No. 14/875,047, filed on Oct. 5, 2015, entitled "CUSTOM OBJECT PATHS FOR OBJECT STORAGE MANAGEMENT," which is incorporated herein by reference for all purposes.

TECHNICAL FIELD

The present disclosure relates to object storage management, and more particularly, to custom object paths for object storage management.

BACKGROUND

In a traditional object storage system, typically a large amount of data is being stored and handled, which generally makes storage space efficiency critical. Data in an object storage system may contain duplicate copies of data, and conventional object storage systems generally remove data redundancy through deduplication techniques. In a traditional deduplication process, unique chunks of data, or byte patterns, are identified and stored during an analysis process. As the analysis continues, other chunks of data are compared to the stored copies of unique data and/or byte patterns. Whenever a match occurs, the redundant chunk of data is replaced with a reference that points to the stored chunk of data. The data may be stored in different storage devices based on capacity of the storage devices, bandwidth of servers, network traffic, etc., and a deduplication system generally analyzes the data on the various storage devices to identify and store the unique chunks of data, and then analyzes the data on the various storage devices to locate data that matches the stored unique chunks of data. In a distributed object storage system, most deduplication techniques require each storage device to look up a global content indexing table to find duplicated content, as well as, update the global content indexing table to reflect any duplicated content's ownership change. Since both the table look up and the table update generally should be exclusive and atomic, the look up and update operations by each storage device significantly slow down I/O (input/output) performance, use a large amount of resources, and can limit the scalability of an object storage system.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe object storage management using custom object paths. An object data storage system stores data as objects. In a traditional object storage system, the path (also known as object name) to an object is generally an opaque string whose meaning is typically only internally interpreted by the object storage system. With conventional object storage systems, applications use immutable paths and commands to access these objects without having to understand the paths' meaning. Implementations of the present disclosure improve data storage efficiency and data deduplication by creating a custom object path for an object that represents the data of the object, and using the custom object paths for the objects to strategically store the objects in particular storage devices. Implementations of the present disclosure use the custom object paths to strategically store objects that contain similar data in the same storage devices. When a deduplication operation is performed, implementations of the present disclosure improve the I/O performance for the deduplication operation and reduce the resources used for the deduplication operation by limiting the storage devices that are being analyzed to particular groups of storage devices.

Figure 1:
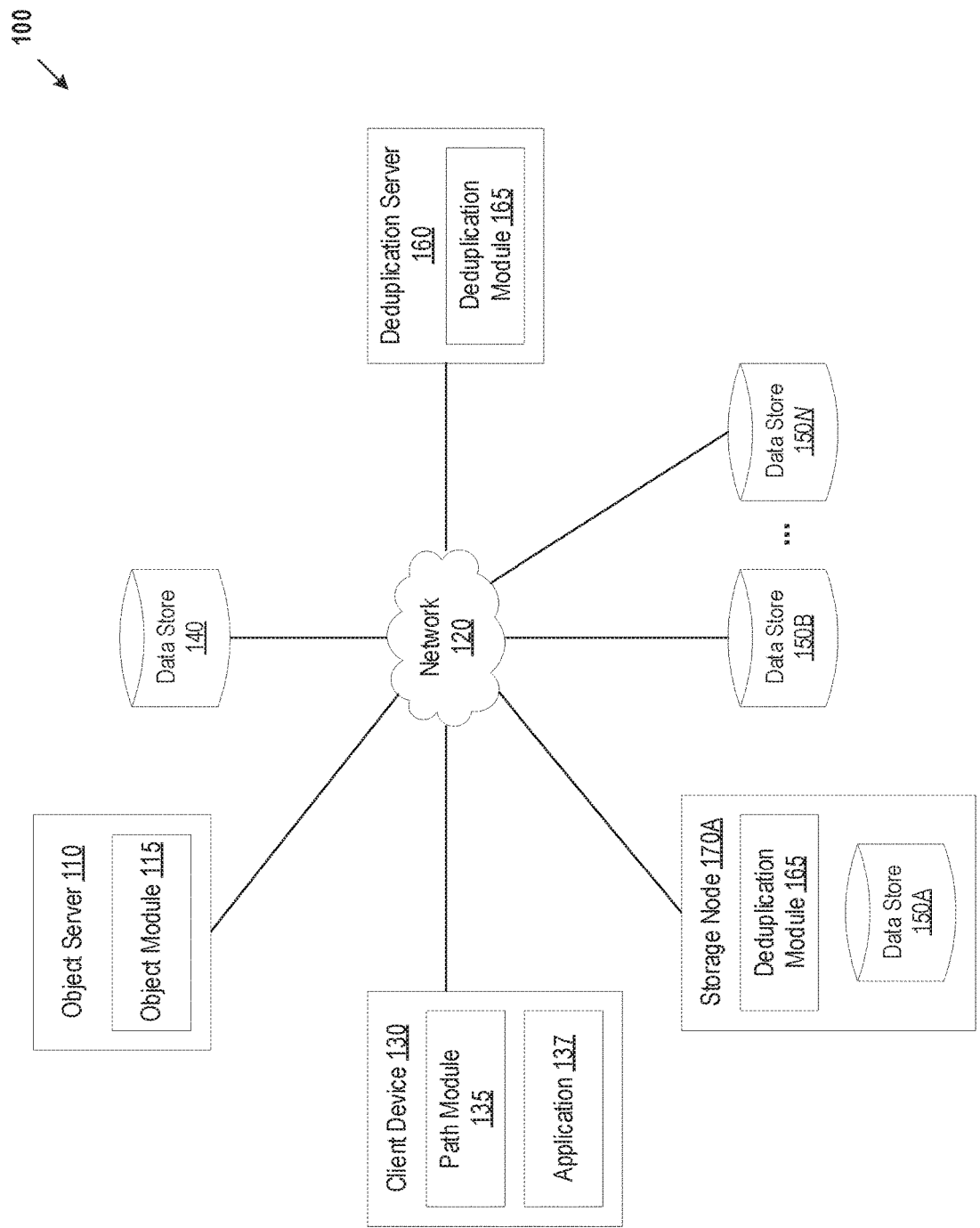
FIG. 1 illustrates an example system architecture, in accordance with various implementations.

FIG. 1 is an example system architecture 100 for various implementations. The system architecture 100 can include an object storage system, where data can be accessed as objects in the object storage system. The object storage system can include one or more object servers 110, one or more storage client devices 130 and one or more storage nodes 170A-170N, one or more data stores 140,150A-150N coupled to each other via one or more networks 120. The networks 120 can be public networks (e.g., the Internet), private networks (e.g., a local area network (LAN) or wide area network (WAN)), or a combination thereof.

The object storage system can be a distributed storage system having multiple object servers 110 to manage objects that are stored in storage nodes 170A-170N. An object server 110 can include, and are not limited to, any data processing device, such as a desktop computer, a laptop computer, a mainframe computer, a personal digital assistant, a server, a handheld device or any other device configured to process data. An object is a basic storage entity that represents the data being stored. An object server 110 can store, retrieve, and delete objects in one or more storage nodes 170A-170N.

The storage nodes 170A-170N can include and/or be coupled to any number of data stores 150A-150N to store the objects. The storage nodes 170A-170N can include, and are not limited to, any data processing device, such as a desktop computer, a laptop computer, a mainframe computer, a personal digital assistant, a server computer, a handheld device or any other device configured to process data. The storage nodes 170A-170N are herein after referred to as a "data nodes," or "nodes."

A data store 140,150A-150N can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

A client device 130 can be a portable computing device such as, and not limited to, mobile telephones, personal digital assistants (PDAs), portable media players, netbooks, laptop computers, an electronic book reader and the like. The client device 130 can also be other types of computing devices such as a server computer, a desktop computer, a set-top box, a gaming console, a television, etc. that may not traditionally be considered to be portable.

An object storage system is a storage architecture that manages data as objects, as opposed to other storage architectures, such as, file systems that manage data as a file hierarchy, and block storage systems that manage data as blocks within sectors and tracks. An object can include the data itself, a variable amount of metadata, and a globally unique identifier.

The client device 130 can host one or more applications 137. An application 137 can be any type of application including, for example, a web application, a desktop application, a browser application, etc., which can be used to perform operations (e.g., read, write, delete, retrieve) on objects. An application 137 on a client device 130 can request an object server 110 to perform one or more various operations (e.g., store, delete, retrieve) be performed on an object. For example, an application 137 can request the object server 110 to perform a HTTP GET operation over the network 120 to retrieve an object that is stored in a data store 150A-150N of a storage node 170A-170N. In another example, an application 137 can request the object server 110 to perform a HTTP PUT operation over the network 120 to store an object to a data store 150A-150N of a storage node 170A-170N.

When an object is first stored in a data store 150A-150N, a path module 135 in a client 130 can create a custom path for the object. The path module 135 can send the custom path for the object and a command for a store operation to be performed on the object to an object server 110. The path module 135 can create a custom path for the particular object that represents the content of the object. The custom path that is created for the particular object has meaning and includes information, which an object server 110 can use to make efficient and strategic routing and storage decisions.

A custom path for an object can be a hash of the content of the object. The path module 135 can use the object's content as input data to a hash algorithm to produce a message. The message can be part of the custom path. The path module 135 can create metadata for the object. The metadata can include an identifier of the hash algorithm that is used to create the custom path for the object.

The object server 110 can include an object module 115 to perform an operation on an object using the custom path of the object. When the object is to be stored in a data store 150A-150N in storage node 170A-170N, the object module 115 can use the custom path of the object to select which data store should be used to store the object. The object module 115 can make storage decisions to group objects that have similar content and store the group of objects on the same data store 150A-150N. A data store can store multiple groups of objects, where each group is made up of objects that have similar content.

An index table can be stored in a data store 140 to store information about the objects stored in the storage system. In one implementation, the data store 140 is storage that is local to an object server 110. In another implementation, the data store 140 is a centralized storage that is accessible to any object server 110 in the storage system. The index table can include an entry for each object that is stored in the storage system. An entry can include a hash value, which is a hash of the content of a respective object, and a corresponding destination point describing the location of where the object is stored in the storage system. A destination point can be a node identifier of the storage node (e.g., storage node 170A-170N) that is storing the respective object. The object module 115 can add an entry to the index table when an object is being stored in the storage system and/or when the destination point of an object has changed.

The object server 110 can receive a request from a client 130 to perform an operation on an object. The request can identify an object and can include the custom path for the object. The object module 115 can use the custom path of the object to search the index table to determine which data store stores content that is similar to the content of the object identified in the request. The object module 115 can route the request to the storage node that corresponds to the data store that stores the similar content.

In one implementation, the object storage system includes one or more deduplication servers 160. A deduplication server 160 can include a deduplication module 165 to perform deduplication operations on data that is stored in the object storage system based on the custom paths of the objects. In one implementation, the individual storage nodes 170A-170N can include a deduplication module 165. Objects that have similar content can be stored together on the same data store. When a deduplication module 165 receives a request to perform deduplication operations on data in the object storage system, the deduplication module 165 can limit scope of performing the deduplication operations to the content that is similar within the same data store, which can improve the I/O performance for the deduplication operations and reduce the resources used for the deduplication operations. The limited scope for performing deduplication operations is described in greater detail below in conjunction with FIG. 7.

Figure 2:
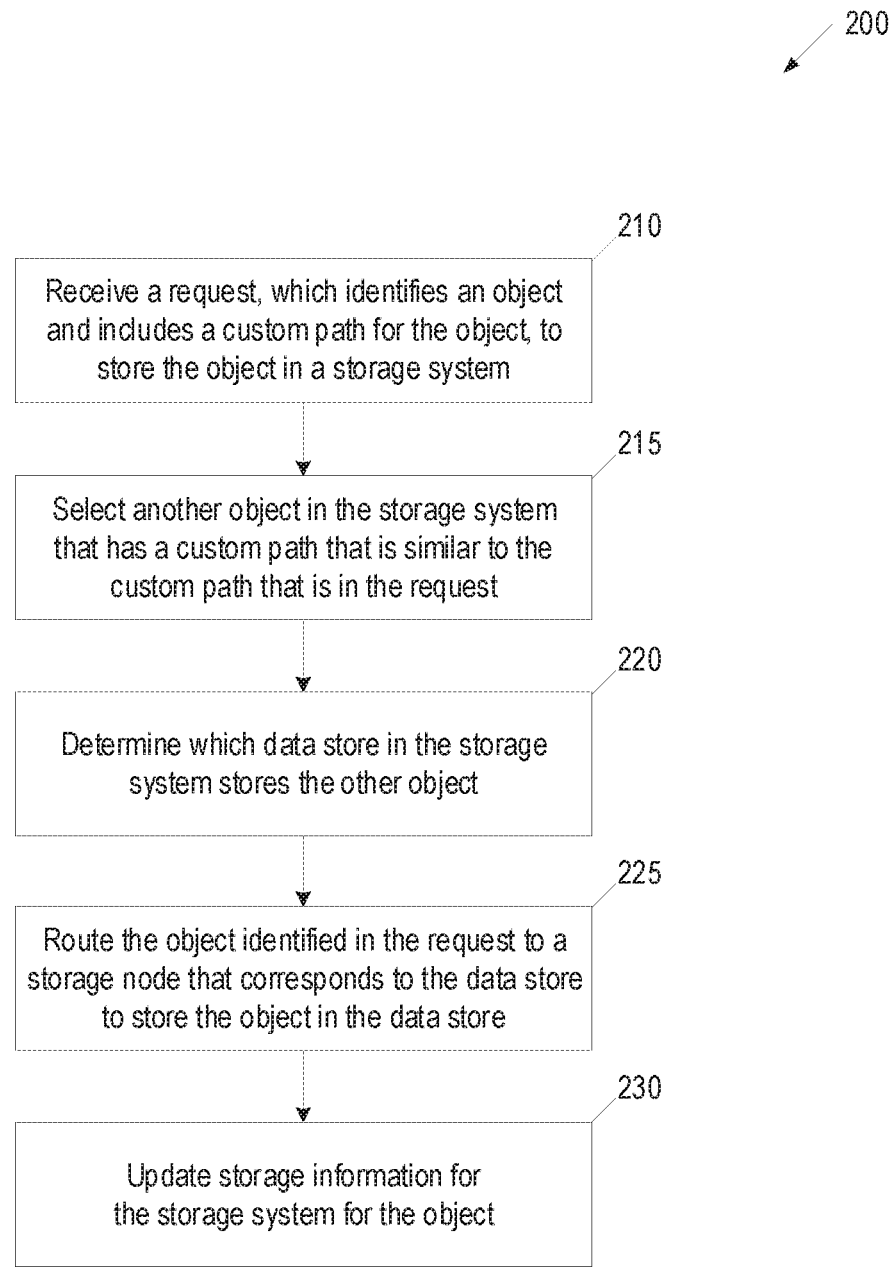
FIG. 2 is a flow diagram for a method for storing objects having similar custom paths in a data store, in accordance with one or more implementations of the present disclosure.

FIG. 2 is a flow diagram for a method 200 for storing objects having similar custom paths in a data store, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a path module (e.g., object module 115 of FIG. 1) executed by a processing device in a computing machine. At least a portion of method 200 can be performed automatically by the computing machine without user interaction.

At block 210, the processing device receives a request that identifies an object to store in a storage system. The request can include the custom path for the object that represents content of the object. The custom path includes a hash value resulting from a hash algorithm being applied to content of the object to represent the content of the object. The request can also include a command (e.g., PUT) to store the object, metadata for the command that identifies the hash algorithm that is used to generate the custom path for the object, and/or the content of the object.

At block 215, the processing device selects another object in the storage system that has a respective custom path that is similar to the custom path in the request. The content of the selected other object is similar to the content of the object that is identified in the request. To select the other object, the processing device can extract a hash value in the custom path of the object that is identified in the request, and search an index table for one or more entries in the index table that have custom paths that have a hash value that is similar to the hash value that is in the custom path in the request.

If the search results include multiple entries that have custom paths that are similar to the hash value that is in the custom path in the request, the processing device can select the entry that has the custom path that has a hash value that is most similar to the hash value that is in the custom path in the request. The processing device can identify, from the entry in the index table, the other object that is associated with the custom path that is selected.

At block 220, the processing device determines which data store in the storage system stores the other object. The processing device can determine, from the entry in the index table, a data store identifier of the data store that stores the other object. At block 225, the processing device routes the content of object identified in the request to a storage node corresponding to the data store to store the content of object in the data store, which also stores the other object. The processing device can determine, from the entry in the index table, a storage node identifier of the storage node that is associated with data store that stores the other object, and can send a message that includes the object and instructions to store the object in the data store, which stores objects that contain content that is similar to the content of the object that is identified in the request.

At block 230, the processing device updates storage information for the storage system for the object. The processing device can add an entry to the index table for the object that is stored in the data store. The entry can include the hash value for the object, an identifier of the data store that is storing the object, and/or an identifier of the storage node that is managing the data store.

Figure 3:
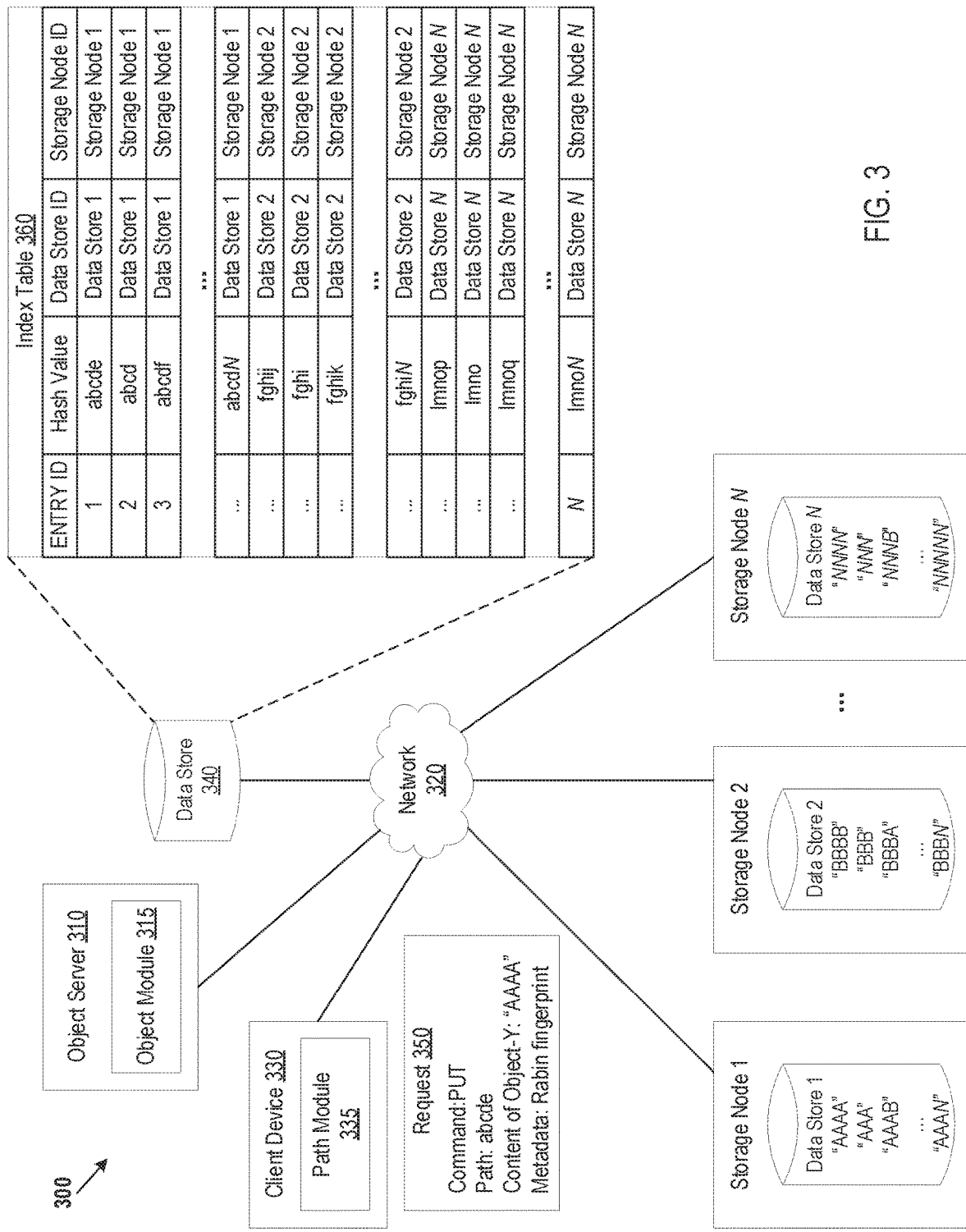
FIG. 3 illustrates an example of using a custom path of an object for storing the object, in accordance with one or more implementations of the present disclosure.

FIG. 3 illustrates an example of using a custom path of an object for storing the object, in accordance with one or more implementations of the present disclosure. The system architecture 300 of an object storage system can include Storage Node 1, Storage Node 2 to Storage Node N to store objects. The storage nodes, one or more client devices 330, one or more object servers 310, data store 340, Data Store 1, Data Store 2, and Data Store N can be coupled via network 320.

Each storage node can include a respective data store (e.g., Data Store 1, Data Store 2, and Data Store 3). The client device 330 can include a path module 335 to generate custom paths for the objects using a hash algorithm. The object server 310 can include an object module 315 to store objects that have similar content within the same data store. For example, Object-1 may have content "AAAA", Object-2 may have content "AAA", Object-3 may have content "AAAB" and Object-X may have content "AAAN". The content of Object-1, Object-2, Object-3 and Object-X are similar to each other and may be stored in the same data store, Data Store 1 that is managed by Storage Node 1.

The object module 315 can create and maintain an index table 360 for the objects. The index table 360 can be stored in a data store 340. The object module 315 can create an entry for each object that is stored in the object storage system. Each entry can include an entry identifier (ID), a hash value for the object, a data store ID of the data store that stores the object, and a storage node ID of the storage node that manages the corresponding data store. For example, Entry ID "1" may be for Object-1 that has "AAAA". Entry ID "1" can include the hash value "abcde", which represents a result of applying a hash algorithm (e.g., Rabin fingerprint) to the content (e.g., AAAA) of Object-1.Entry ID "1" can include the data store ID "Data Store 1" for the data store that is storing Object-1, and the storage node ID "Storage Node 1" for the storage node that corresponds to Data Store 1.

The client device 330 may send a request 350 to the object server 310 to request the object module 315 on the object server 310 to perform an operation (e.g., store content of an object) on an object (e.g., Object-Y) in the object storage system. The request 350 can include a command for the operation that is to be performed for an object. For example, the command may be a "PUT" command to store an object in the object storage system, a "GET" command to retrieve an object from the object storage system, or a "DELETE" command to remove an object from the object storage system. The request 350 can include the custom path for the object, the content of the object, an identifier of the object, and metadata describing a hash algorithm that is used for the object.

The path module 335 can be configured to user a particular cryptographic hash algorithm to generate a message (also referred to as "hash value") for the object. For example, the path module 335 may be configured to use a Rabin fingerprint hash algorithm, and can input the content "AAAA" of Object-Y into the Rabin fingerprint hash algorithm to produce the hash value "abcde" for Object-Y.

In one implementation, the path module 335 uses only the hash value as the custom path for the object. In another implementation, the path module 335 uses the hash value and other information (e.g., backslashes, directory names, container names, account names, colons, etc.) as the custom path for the object. The path module 335 can generate metadata, which identifies the hash algorithm that is used for generating a custom path, for the command in the request 350. In one implementation, the path module 335 embed the metadata into the command.

The object module 315 can receive the request 350 to store the content of Object-Y in the object storage system, and can use the index table 360 to make a storage decision and routing decision.

In one implementation, where the custom path consists only of a hash value, the object module 315 extracts the custom path in the request 350 and uses the custom path to search for a matching custom path in the index table 360. The object module 315 can search the hash values in the index table 360 to find a matching hash value. In one implementation, the search results include multiple hash values that are the closest matching hash values to the custom path in the request 350, and the object module 315 selects an entry having the most similar hash value. For example, the object module 315 may select Entry ID "1", which has the hash value "abcde" that matches the custom path "abcde" in the request 350. The object module 315 can identify the data store and storage node in the selected entry (e.g., Entry ID "1"), and can route the content of Object-Y to Storage Node 1 with instructions for Storage Node 1 to store the content of Object-Y in Data Store 1, with the other objects that have content that is similar to the content of Object-Y.

Figure 4:
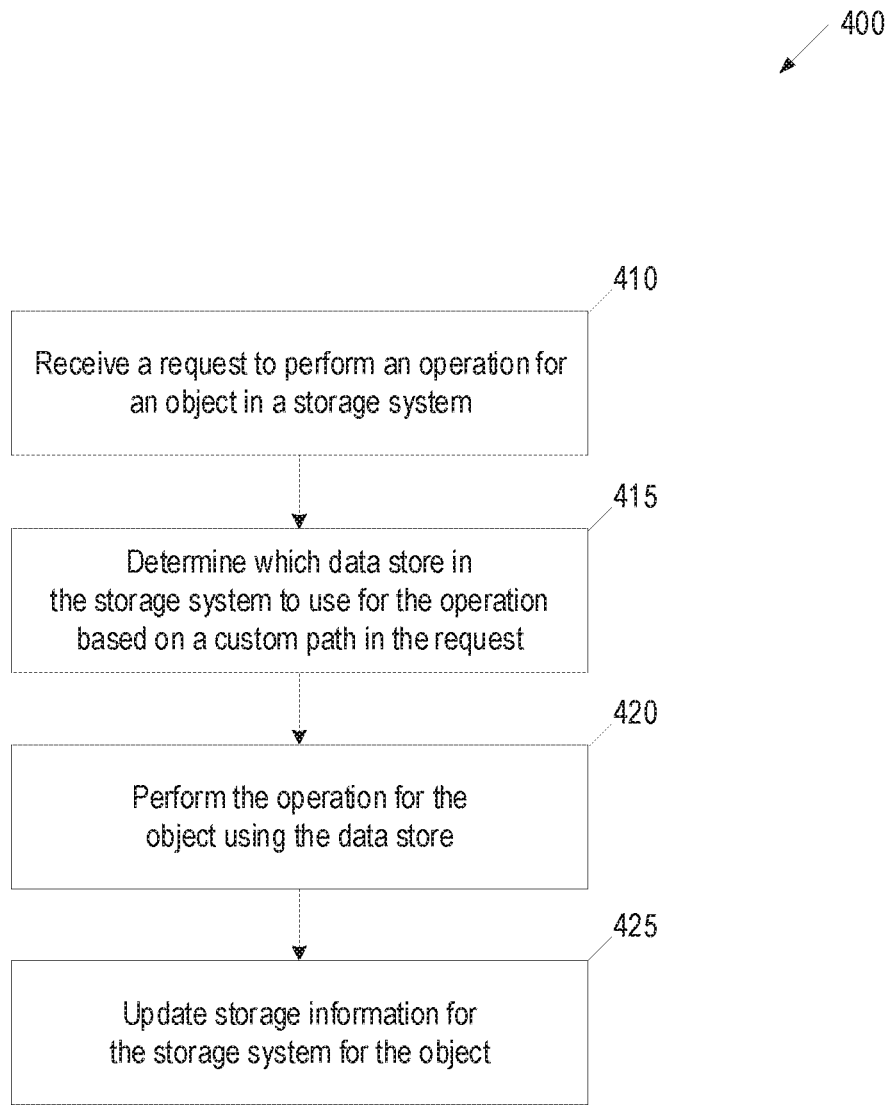
FIG. 4 is a flow diagram is a flow diagram for a method 400 for performing operations on objects using custom paths for the objects, in accordance with one or more implementations of the present disclosure.

FIG. 4 is a flow diagram is a flow diagram for a method 400 for performing operations on objects using custom paths for the objects, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by an object module (e.g., object module 115 of FIG. 1) executed by a processing device in a computing machine. At least a portion of method 400 can be performed automatically by the computing machine without user interaction.

At block 410, the processing device receives a request to perform an operation for an object in a storage system. The request can include a command, a custom path for the object, an object identifier, content of the object, and metadata for the object. Examples of the operation can include, and are not limited to, storing an object in the storage system, retrieving an object from the storage system, and deleting an object from the storage system.

At block 415, the processing device determines, based on the custom path for the object in the request, which data store in the storage system to use for the operation. The processing device can use the custom path to search an index table to determine which data store to use. If the operation is to store an object in the storage system, the processing device can search for an entry in the index table that has a hash value that is the closest match to the custom path in the request. If the operation is to retrieve an object in the storage system or to remove an object from the storage system, the processing device can search for an entry in the index table that matches the custom path in the request to determine which data store stores the object.

At block 420, the processing device performs the operation for the object using the data store. The processing device can identify the storage node, from the entry in the index table, and route the request to the storage node with instructions for the storage node to perform the operation specified in the request. At block 425, the processing device updates storage information for the storage system for the object. If the operation is to store an object in the storage system, the processing device can add an entry to the index table for the object that is stored in the data store. If the operation is to remove an object in the storage system, the processing device can remove an entry from the index table.

Figure 5:
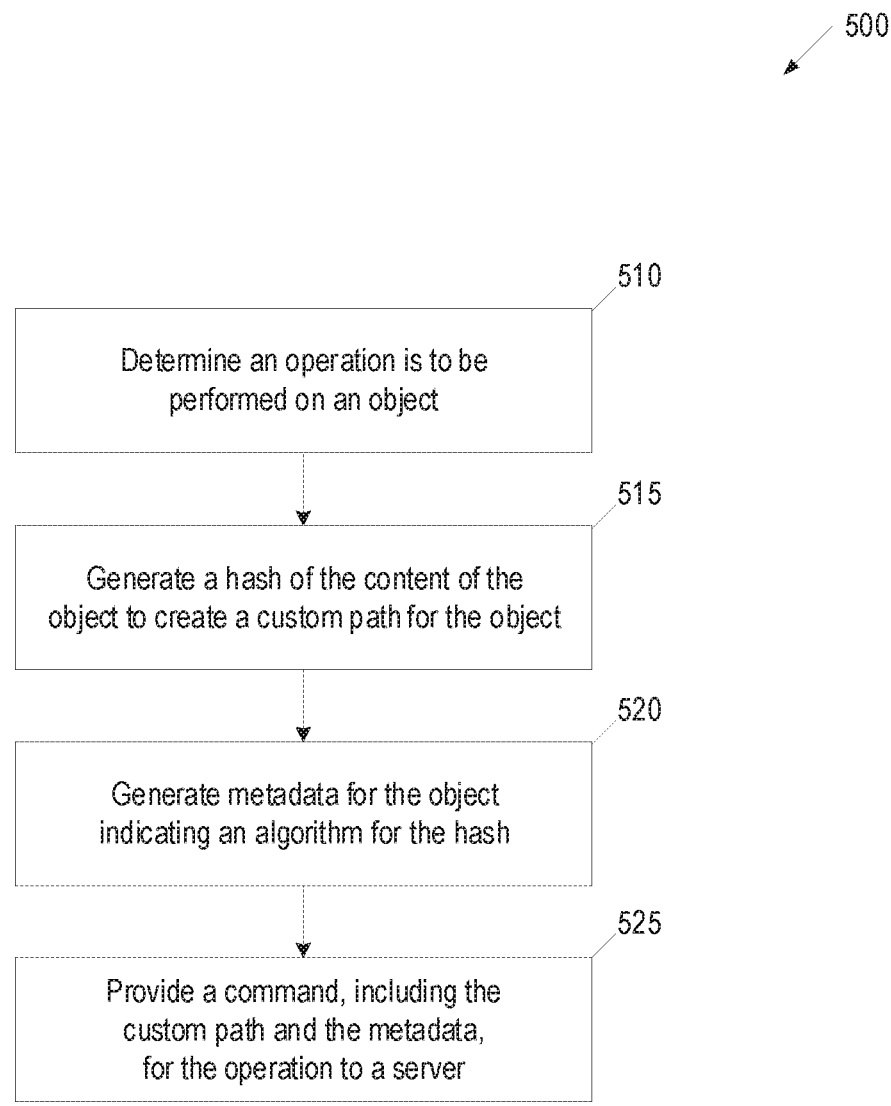
FIG. 5 is a flow diagram for a method for creating a custom object path for an object, in accordance with one or more implementations of the present disclosure.

FIG. 5 is a flow diagram for a method 500 for creating a custom object path for an object, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a path module (e.g., path module 135 of FIG. 1) executed by a processing device in a computing machine. At least a portion of method 500 can be performed automatically by the computing machine without user interaction.

At block 510, the processing device determines an operation is to be performed on an object. The processing device can receive a request, from an application, for the operation (e.g., store object, retrieve object, delete object) to be performed. At block 515, the processing device generates a hash of the content of the object to create a custom path for the object. The processing device can apply a cryptographic hash function (e.g., Rabin fingerprint) to the object's content to produce a message (hash value). The hash function can be a content preserving hashing algorithm. The hash value and/or other information (e.g., directory name, container name, account name, backslashes, etc.) pertaining to the path schema of the object storage system, can form the custom path for the object.

At block 520, the processing device generates metadata for the object. The metadata indicates the algorithm for the hash. At block 525, the processing device provides a command, including the custom path and the metadata, for the operation to an object server for the operation to be performed. A processing device of the object server can determine which storage node should be used for the operation based on the custom path. The processing device of the object server can identify the storage node, from entries in an index table, and route the request to the storage node with instructions for the storage node to perform the operation specified in the request. The processing device of the object server can select one or more entries that have a hash value that is most similar to the hash value in the custom path in the request and determine which storage node corresponds to the selected entries.

Figure 6:
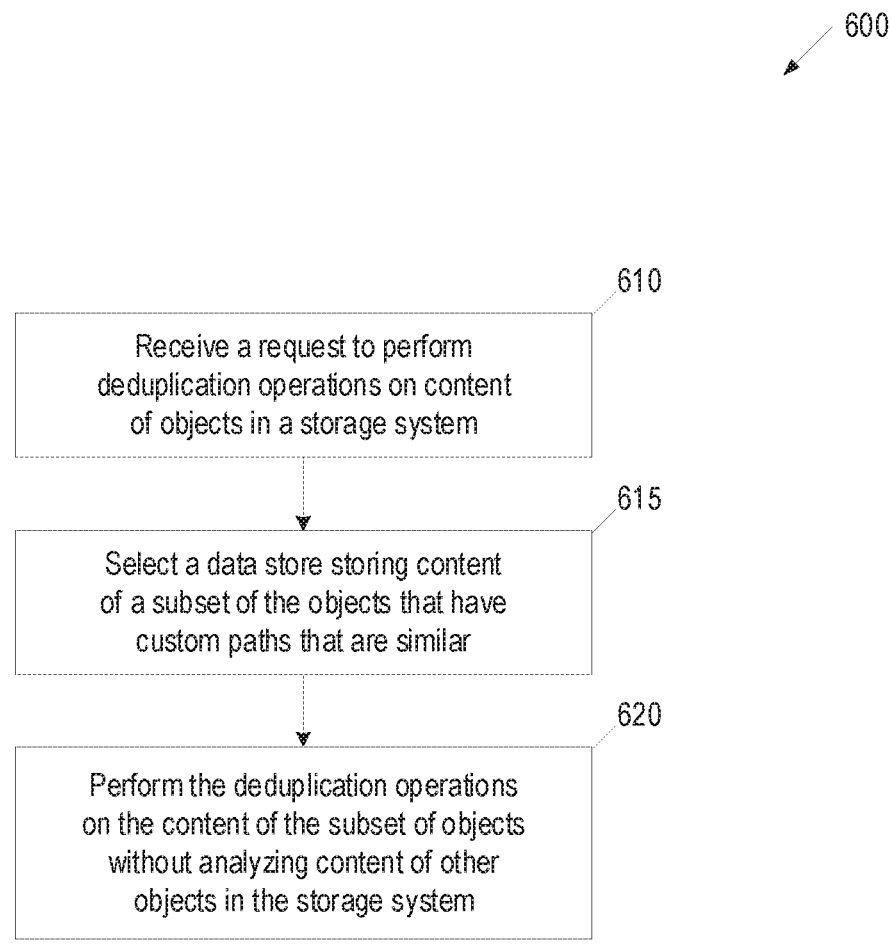
FIG. 6 is a flow diagram for a method for performing deduplication operations using custom object paths, in accordance with one or more implementations of the present disclosure.

FIG. 6 is a flow diagram for a method 600 for performing deduplication operations using custom object paths, in accordance with one or more implementations of the present disclosure. Method 600 can be performed by processing logic that can comprise hardware (e.g., circuitry, dedicated logic, programmable logic, microcode, etc.), software (e.g., instructions run on a processing device), or a combination thereof. In one implementation, method 400 is performed by a deduplication module (e.g., deduplication module 165 of FIG. 1) executed by a processing device in a computing machine. At least a portion of method 600 can be performed automatically by the computing machine without user interaction.

At block 610, the processing device receives a request to perform deduplication operations on content of objects in a storage system. The request can be received from a scheduling system that schedule deduplication for the storage system. At block 615, the processing device selects a data store storing content of a subset of the objects that have custom paths that are similar. The processing device can search an index table (e.g., index table 360 in FIG. 3) for a subset of hash values, which correspond to custom paths of a subset of objects in the storage system, in the index table that are similar to each other. The search results can include more multiple subset of hash values, where each subset includes hash values that are similar to each other. The processing device can identify the data store, from entries in the index table, that store a subset of objects that correspond to a respective subset of hash values that are similar to each other. At block 620, the processing device performs the deduplication operations on the content of at least one of the subset of objects without analyzing content of other objects in the storage system.

Figure 7:
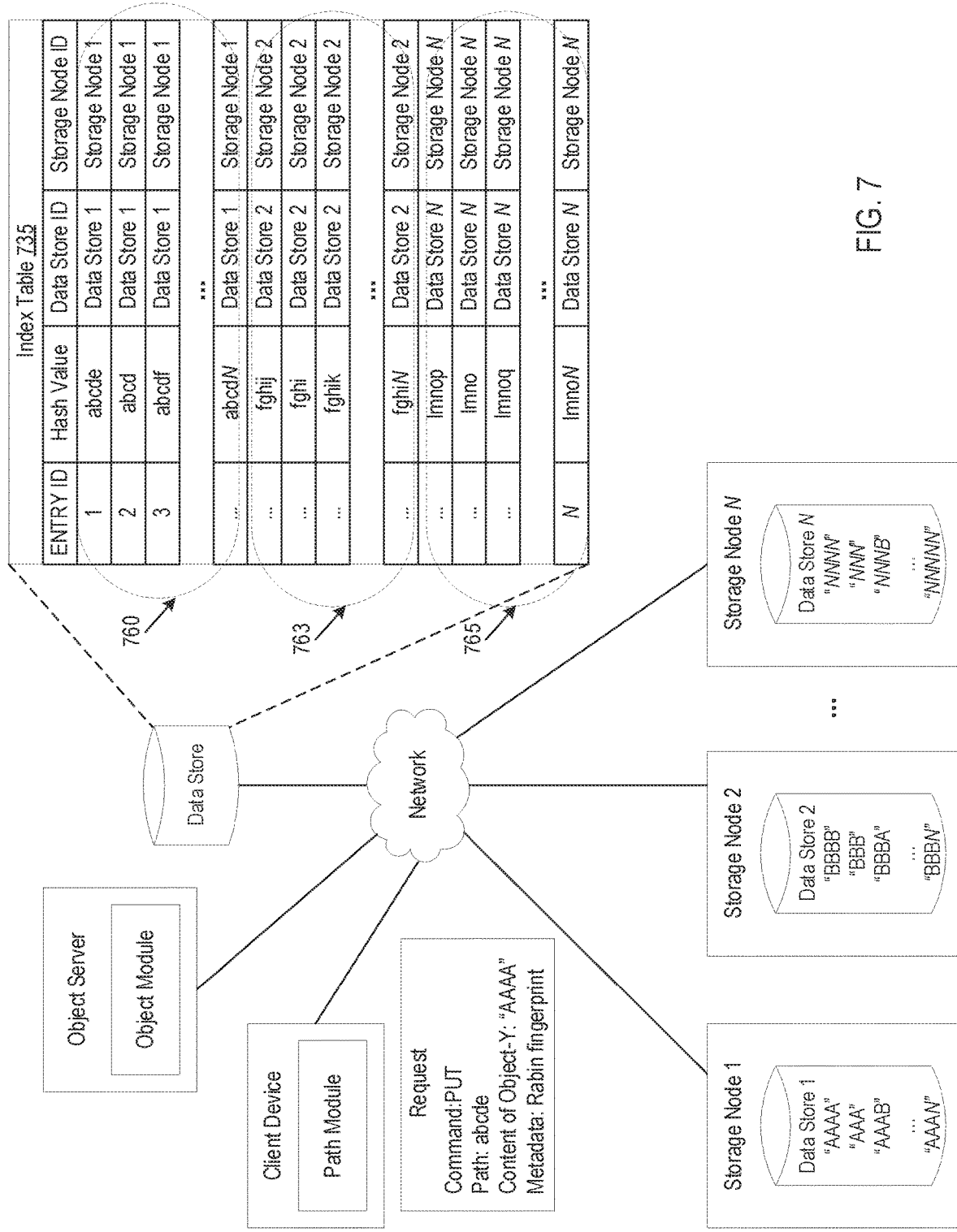
FIG. 7 illustrates an example of limiting the scope for performing deduplication operations using custom paths for object, in accordance with one or more implementations of the present disclosure.

FIG. 7 illustrates an example of limiting the scope for performing deduplication operations using custom paths for object, in accordance with one or more implementations of the present disclosure. For example, the processing device may search the index table 735 for hash values that are similar to each other. The search results may include multiple subsets (e.g., subset 760, subset 763, and subset 765) of hash values that are similar to each other. The processing device may determine that Data Store 1 stores the subset of objects that corresponds to the subset 760 of hash values that are similar to each other, and may perform the deduplication operations on the content of the subset of objects that have hash values, which are used as custom paths for the respective objects, that are similar to each other, without analyzing content of other objects, such as objects stored on Data Store 2 and Data Store N, as part of the deduplication process being performed on Data Store 1. When the deduplication operations are performed and limited to the scope of objects that have similar custom paths on a particular data (e.g., Data Store 1), the I/O performance for the deduplication operations are improved, and the resources used for the deduplication operations are reduced, since the processing device does not compare content of objects that are stored on other data stores (e.g., Data Store 2, Data Store N) to the content of the objects that are stored on the particular data store (e.g., Data Store 1).

Figure 8:
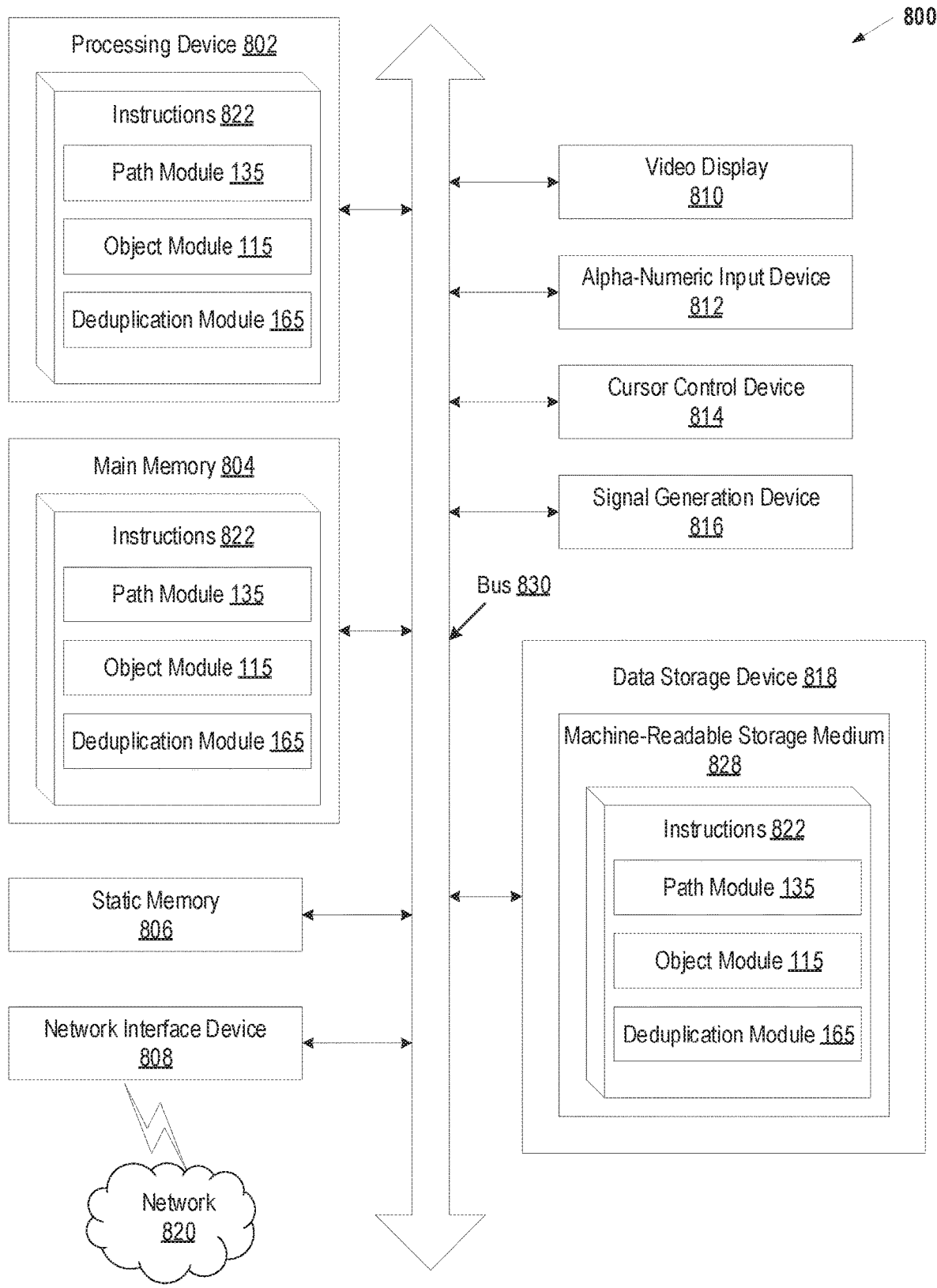
FIG. 8 is a block diagram of an example computer system that may perform one or more of the operations described herein.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data store device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT), an alphanumeric input device 812 (e.g., a keyboard), a cursor control device 814 (e.g., a mouse), and a signal generation device 816 (e.g., speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a path module (e.g., path module 135 of FIG. 1), and/or a software library containing methods that call the path module. In one implementation, the instructions 822 include instructions for an object module (e.g., object module 115 of FIG. 1), and/or a software library containing methods that call the object module. In one implementation, the instructions 822 include instructions for a deduplication module (e.g., deduplication module 165 of FIG. 1), and/or a software library containing methods that call the deduplication module. While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "selecting" or "determining" or "routing" or "extracting" or "searching" or "identifying" or "performing" or "retrieving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device, a request to perform an operation for a first object in a storage system, wherein the request comprises a first custom path for the first object that represents content of the first object, wherein at least a portion of the first custom path for the first object comprises a hash value resulting from a hash function applied to content of the first object;
identifying a plurality of other objects each having custom paths that are similar to the first custom path for the first object of the request;
determining, by the processing device, a second object of the plurality of other objects, the second object having a second custom path that satisfies a similarity criterion with respect to the first custom path for the first object;
identifying, by the processing device, a storage node of the storage system comprising a data store that stores the second object; and
performing, by the processing device, the operation for the first object using the data store of the identified storage node.

2. The method of claim 1, wherein the operation comprises at least one of: storing the first object in the storage system, retrieving the first object from the storage system, or deleting the first object from the storage system.

3. The method of claim 1, wherein identifying the storage node of the storage system comprising the data store that stores the second object comprises:
identifying, from an index data structure associated with the data store, the second object having the second custom path; and
determining a storage node identifier associated with the second object.

4. The method of claim 3, wherein identifying the second object comprises:
extracting the hash value from the first custom path of the first object;
searching the index data structure for one or more custom paths that comprise a hash value corresponding to the extracted hash value;
selecting the second custom path, wherein the second custom path comprises the corresponding hash value; and
identifying the second object associated with the selected second custom path.

5. The method of claim 1, wherein performing the operation for the first object using the data store comprises:
routing, to the storage node, instructions for the storage node to perform the operation of the request.

6. The method of claim 1, wherein the request comprises metadata that identifies the hash function.

7. The method of claim 1, further comprising:
receiving a request to perform deduplication operations on content of a plurality of objects in the storage system;
selecting one or more data stores storing content of a subset of the plurality of objects, wherein the subset of the plurality of objects have similar custom paths; and
performing the deduplication operations on the content of the subset of the plurality of objects, wherein the performing of the deduplication operations comprises analyzing the content of the subset of the plurality of objects that are stored on the one or more data stores without analyzing content of other objects of the plurality of objects that are stored in the storage system.

8. A non-transitory computer-readable storage medium including instructions that, when executed by a processing device, cause the processing device to:
receive a request to perform an operation for a first object in a storage system, wherein the request comprises a first custom path for the first object that represents content of the first object, wherein at least a portion of the first custom path for the first object comprises a hash value resulting from a hash function applied to content of the first object;
identify a plurality of other objects each having custom paths that are similar to the first custom path for the first object of the request;
identify a second object of the plurality of other objects, the second object having a second custom path that satisfies a similarity criterion with respect to the first custom path for the first object;
identifying a storage node of the storage system comprising a data store that stores the second object; and
perform the operation for the first object using the data store of the identified storage node.

9. The non-transitory computer-readable storage medium of claim 8, wherein the operation comprises at least one of: storing the first object in the storage system, retrieving the first object from the storage system, or deleting the first object from the storage system.

10. The non-transitory computer-readable storage medium of claim 8, wherein to identify the storage node of the storage system comprising the data store that stores the second object, the processing device is to:
- identify, from an index data structure associated with the data store, the second object having the second custom path; and
- determine a storage node identifier associated with the second object.

11. The non-transitory computer-readable storage medium of claim 10, wherein to identify the second object, the processing device is to:
- extract the hash value from the first custom path of the first object;
- search the index data structure for one or more custom paths that comprise a hash value corresponding to the extracted hash value;
- select the second custom path, wherein the second custom path comprises the corresponding hash value; and
- identify the second object associated with the selected second custom paths.

12. The non-transitory computer-readable storage medium of claim 8, wherein to perform the operation for the first object using the data store, the processing device is to:
- route, to the storage node, instructions for the storage node to perform the operation of the request.

13. A system comprising:
- a memory;
- a processing device, operatively coupled to the memory, to:
  - receive a request to perform an operation for a first object in a storage system, wherein the request comprises a first custom path for the first object that represents content of the first object, wherein at least a portion of the first custom path for the object comprises a hash value resulting from a hash function applied to content of the first object;
  - identify a plurality of other objects each having custom paths that are similar to the first custom path for the first object of the request;
  - identify a second object of the plurality of other objects, the second object having a second custom path that satisfies a similarity criterion with respect to the first custom path for the first object,
  - identify a storage node of the storage system comprising a data store that stores the second object; and
  - perform the operation for the first object using the data store of the identified storage node.

14. The system of claim 13, wherein the operation comprises at least one of: storing the first object in the storage system, retrieving the first object from the storage system, or deleting the first object from the storage system.

15. The system of claim 13, wherein to identify the storage node of the storage system comprising the data store that stores the second object, the processing device is to:
- identify, from an index data structure associated with the data store, the second object having the second custom path; and
- determine a storage node identifier associated with the second object.

16. The system of claim 15, wherein to identify the second object, the processing device is to:
- extract the hash value from the first custom path of the first object;
- search the index data structure for one or more custom paths that comprise a hash value corresponding to the extracted hash value;
- select the second custom path, wherein the second custom path comprises the corresponding hash value; and
- identify the second object associated with the one or more selected custom paths.

17. The system of claim 13, wherein to perform the operation for the first object using the data store, the processing device is to:
- route, to the storage node, instructions for the storage node to perform the operation of the request.

18. The system of claim 13, wherein the request comprises metadata that identifies the hash function.

* * * * *